United States Patent [19]
Zdrahala et al.

[11] 4,190,711
[45] Feb. 26, 1980

[54] THERMOPLASTIC POLYETHER POLYURETHANE ELASTOMERS

[75] Inventors: Richard J. Zdrahala, Frank E. Critchfield, South Charleston, both of W. Va.

[73] Assignee: Union Carbide Corporation, New York, N.Y.

[21] Appl. No.: 838,017

[22] Filed: Sep. 29, 1977

[51] Int. Cl.$^2$ .................. C08G 18/48; C07C 125/04; C08G 18/14
[52] U.S. Cl. .................. 521/112; 264/328; 264/329; 521/159; 521/914; 528/66; 560/26
[58] Field of Search .................. 521/159, 112, 914; 528/66; 560/26

[56] References Cited
U.S. PATENT DOCUMENTS

| | | | |
|---|---|---|---|
| 3,575,896 | 4/1971 | Khan | 521/159 |
| 3,821,130 | 6/1974 | Barron et al. | 521/159 |
| 3,823,201 | 7/1974 | Pizzini et al. | 260/861 |
| 3,905,925 | 9/1975 | Vervloet | 521/159 |
| 4,048,105 | 9/1977 | Salisbury | 521/159 |
| 4,049,636 | 9/1977 | Mao et al. | 260/77.5 CR |

Primary Examiner—H. S. Cockeram
Attorney, Agent, or Firm—Richard J. Gallagher

[57] ABSTRACT

Thermoplastic polyether polyurethane elastomers are provided by reacting and forming: (a) a novel liquid polyurethane quasi-prepolymer having a free NCO content of from about 16 percent to about 25 percent; (b) a reactive poly(oxypropylene-oxyethylene) diol; and (c) as an extender, a short chain diol in the presence of (d) a catalyst. The elastomers can be either solid or microcellular, and they are suitable for production using Reaction Injection Molding (RIM) or conventional casting technology. The elastomers are useful in the production of automotive body panels, gears, seals and the like, and, since the elastomers are thermoplastic, any excess elastomer ("scrap") can be reused.

36 Claims, No Drawings

THERMOPLASTIC POLYETHER POLYURETHANE ELASTOMERS

BACKGROUND AND DESCRIPTION OF THE PRIOR ART

A variety of thermoplastic polyester polyurethane elastomers having generally satisfactory properties are known in the art. Such elastomers include polylactone polyurethane elastomers which are somewhat hydrolytically unstable and expensive. However, as far as is known, the only varieties of thermoplastic polyether polyurethane elastomers having satisfactory properties are those disclosed in U.S. Pat. Nos. 3,933,937 and 3,933,938.

U.S. Pat. No. 3,933,937 discloses, inter alia, a process for preparing an injection-moldable thermoplastic polyether polyurethane elastomer by (I) reacting an aromatic diisocyanate with a modified polyol (polymer/polyether diol) to produce a polyurethane quasi-prepolymer having a free NCO content of from 7 to 15 percent (preferably from 8 to 12 percent) and then (II) reacting said prepolymer with a short chain alkane diol to produce an injection molding-grade elastomer in the absence of a catalyst. However, the elongation and Die "C" tear strength of these elastomers are not as good as may be desired. U.S. Pat. No. 3,933,938 discloses a similar process for preparing a thermoplastic elastomer where a polyalkane ether diol (polyether diol) is used as an additional reactant in step (I) of U.S. Pat. No. 3,933,937 apparently to improve the tear strength and elongation of the elastomers. However, the only specific polyalkane ether diol disclosed in the patent (polytetramethylene ether glycol-"PTMEG") is expensive.

Moreover, quasi-prepolymers having relatively low free NCO contents, such as those disclosed in the above-mentioned patents, are of generally undesirably high viscosities and the resulting thermoplastic polyether urethane elastomers possess low to moderate flexural modulus (stiffness) and hardness. Further, the processess for producing thermoplastic polyether urethane elastomers disclosed in the abovementioned patents are characterized by relatively slow processing times.

Rapid processing times of less than one minute are known to be obtainable by simultaneously reacting and forming polyether polyurethane elastomer formulations using a process such as the Reaction Injection Molding (RIM) process. However, such formulations generally produce thermoset elastomers and so any scrap produced is relatively useless.

It is an object of this invention to provide thermoplastic polyether polyurethane elastomers having satisfactory properties (including elongation and tear strength) from relatively inexpensive starting materials.

It is a further object of this invention to produce thermoplastic polyether polyurethane elastomers having high flexural modulus (stiffness) and hardness from quasi-prepolymers having relatively low viscosities.

Another object of this invention is to provide a relatively rapid process for producing polyether polyurethane elastomers useful, for example, in the RIM process.

Still another object of this invention is to provide a polyurethane quasi-prepolymer that is useful in the RIM process.

These and other objects of this invention will become apparent from a reading of the following detailed specification.

SUMMARY OF THE INVENTION

The present invention relates, in part, to a process for producing solid or microcellular polyether polyurethane elastomers comprising reacting a reaction mixture containing:

(a) a liquid polyurethane quasi-prepolymer that has a free NCO content of from about 16 percent to about 25 percent, that is present in the reaction mixture in an amount that provides from 0.8 to 1.1 isocyanate groups per active hydrogen group in the reaction mixture and that is produced by reacting a poly(oxypropylene-oxyethylene) diol having a molecular weight of at least 500 with an excess of an aromatic diisocyanate, (b) a poly(oxypropylene-oxyethylene) diol having a molecular weight of at least 1000, having terminal oxyethylene groups, and having a primary hydroxyl content of at least 50 (preferably at least 70) mole percent.

(c) a diol extender selected from the group consisting of short-chain alkane diols and short-chain oxyalkylene glycols, and (d) a catalytic amount of catalyst for curing the reaction mixture to produce the elastomer, said reaction mixture containing from 95 to 25 parts by weight of (b) and from 5 to 75 parts by weight of (c) per 100 parts by weight of (b) and (c).

When a microcellular elastomer is desired, the reaction mixtures used in the process of the present invention also include:

(e) a blowing agent in an amount sufficient to produce a microcellular structure in the elastomer.

The invention also relates to the elastomers produced by the above-described process.

In a further aspect of the present invention, the elastomer of the present invention may be re-formed by a process which comprises:

(1) pelletizing an elastomer of this invention formed as described above to produce pellets, and (2) injection molding said pellets at a temperature of from about 300° F. to about 500° F. This re-forming process can be applied to the elastomers of this invention either alone or in combination with other thermoplastic polyurethane elastomers using conventional injection molding or extrusion technology.

The elastomers of the present invention can be produced using Reaction Injection Molding (RIM) or conventional casting technology. The elastomers are useful in the production of automotive body panels, gears, seals and the like.

DESCRIPTION OF THE PREFERRED EMBODIMENTS

The poly(oxypropylene-oxyethylene) diols useful in the process of the present invention (see components (a) and (b) of the above-specified reaction mixture) are propylene oxide and ethylene oxide adducts of dihydroxyalkanes. Illustrative propylene oxide-ethylene oxide adducts of dihydroxyalkanes include, among others, those adducts of ethylene glycol, propylene glycol, 1,3-dihydroxypropane, 1,3-dihydroxybutane, 1,4-dihydroxybutane, 1,4-, 1,5-, and 1,6-dihydroxyhexane, 1,2-, 1,3-, 1,4-, 1,6-, and 1,8-dihydroxyoctane, 1,10-dihydroxydecane, and the like; and those adducts of diethylene glycol, triethylene glycol, tetraethylene glycol, dipropylene glycol, tripropylene glycol, tetrapropylene glycol, dibutylene glycol, as well as the high molecular weight polyoxyethylene glycols, high molecular weight polyoxypropylene glycols, mixed ethylene-propylene glycols, mixed polyoxyethylene-polyoxypropylene glycols, and the like. The propylene oxide and ethylene oxide may be incorporated into the diol backbone as a mixed monomer feed or as block copolymers. The useful diols have from about 5 to about 60 weight percent ethylene oxide content and from about 95 to about 40 weight percent propylene oxide based on the total weight of ethylene oxide and propylene oxide in the diol, of which from about 5 to about 25 weight percent ethylene oxide is added as a cap. These ethylene oxide capped ($-OC_2H_4OH$ terminated) diols are useful in the present invention because of their increased reactivity over noncapped propylene oxide-ethylene oxide diols, thus providing the decreased demold times necessary for the RIM technique.

The poly(oxypropylene-oxyethylene) diols useful in producing the quasi-prepolymers employed in the present invention (see component (a) of the above-specified reaction mixture) have a molecular weight of at least 500. The poly(oxypropylene-oxyethylene) diols useful in producing urethane groups by reaction with the quasi-prepolymers employed in the present invention (see component (b) of the above-specified reaction mixture) have a molecular weight of at least 1000 (preferably from 3,000 to 5,000) and a hydroxyl number of from 20 to 120 (preferably from 25 to 50), and they have terminal oxyethylene groups and a primary hydroxyl content of at least 50 (preferably at least 70) mole percent.

The poly(oxypropylene-oxyethylene) diols useful in the process of the present invention can be polymer/poly(oxypropylene-oxyethylene) diols. These polymer/diols are produced from the above-described poly(oxypropyleneoxyethylene) diols and monomers such as hydrocarbon olefins (e.g., styrene, chlorostyrene), olefinic nitriles (e.g., acrylonitrile, methacrylonitrile), alkenyl esters of alkanoic acids (e.g., vinyl acetate, vinyl propionate, vinyl butyrate), alkyl acrylates (e.g., methyl acrylate and ethyl acrylate), alkyl methacrylates (e.g., methylmethacrylate and ethylmethacrylate), unsaturated aliphatic acids (e.g., acrylic acid and methacrylic acid). The preferred olefin is acrylonitrile alone or mixed with styrene. Preferably, the polymer component is formed in situ by polymerizing one or more polymerizable monomers in the diol.

The polymer in the polymer/diols useful in the invention is dissolved or dispersed in the diol component. The polymer content of the polymer/diol will vary from about 5 weight percent to about 60 weight percent based upon the weight of the polymer/diol depending upon the requirements of the end use application. For applications wherein an all acrylonitrile or an acrylonitrile/styrene system is employed, a polymer content of from about 10 to about 25 weight percent is preferred.

It should also be understood that the polymer/diol may be blended with any of the herein-described poly(oxypropylene-oxyethylene) diols in order to reduce the polymer content to the required level for a particular application. Indeed, blending will generally be preferred when relatively low amounts of polymer content (e.g., less than about 10 weight percent) are needed in view of the economic penalty involved in forming polymer/diols with such relatively low polymer content in the first instance.

The techniques for preparing polymer/diols are well known, and any known technique may be employed. The polymer/diols useful in the present invention are preferably produced by utilizing the process set forth in co-pending application Ser. No. 417,487, filed Nov. 20, 1973, and incorporated herein by reference. In accordance with that process, a low monomer to diol ratio is maintained throughout the reaction mixture during the process of the reaction. This is achieved by employing process conditions that provide for rapid conversion of monomer to polymer. In practice, a low monomer to diol ratio is maintained, in the case of semi-batch and continuous operation, by control of the temperature and mixing conditions, and, in the case of semi-batch operation, by slowly adding the monomers to the diol.

The polyurethane quasi-prepolymer useful in the present invention is a liquid having a free NCO content of from about 16 to about 25 percent (preferably from about 18 to about 22 percent), produced by reacting the above-described poly(oxypropylene-oxyethylene) diol with an aromatic diisocyanate using conventional techniques. The useful quasi-prepolymers have a viscosity of from 150 to 5000 (preferably 300 to 1000) centipoise at 25° C. The quasi-prepolymer should be present in an amount that provides from 0.8 to 1.1 isocyanato groups per active hydrogen group in the reaction mixture. Useful aromatic diisocyanates include m,p-phenylene diisocyanate, p-xylene diisocyanate, 4,4'-bisphenylenediisocyanate, 3,3'-dimethyl-4, 4'-bisphenylene diisocyanate, 3,3'-dimethoxy-4,4'-phenylene diisocyanate, 1,5-naphthalene diisocyanate 4,4'-methylene-bis-orthotolyl diisocyanate, isophorone diisocyanate, and 4,4'-diphenylmethane diisocyanate ("MDI"). The preferred diisocyanate is 4,4'-diphenylmethane diisocyanate. Useful polyether diols are those having a molecular weight of from about 500 to about 4,000, preferably from about 1,500 to about 2.500. Procedures for preparing quasi-prepolymers are disclosed in French Patent No. 1,478,664 and U.S. Pat. Nos. 3,883,571 and 3,905,925.

Any of the known short chain alkane diol, cycloaliphatic diol, or oxyalkylene glycol chain extenders having a backbone of from 2 to 6 carbon atoms, may be utilized in the process of forming the elastomers of the present invention. Useful chain extenders include 1,3-propanediol; 1,4-butanediol; 1,5-pentanediol; 1,6-hexanediol; ethylene glycol; and, diethylene glycol. Also useful is the 2 mole ethylene oxide adduct of hydroquinone. The preferred chain extenders are 1,4-butanediol and ethylene glycol.

The amount of the chain extender employed, will, of course, vary over a wide range, depending upon the physical property requirements of the elastomer for the particular end use application. The amount of extender present in the reaction mixture can range from about 5 to about 75 weight percent, based on the weight of the poly(oxypropyleneoxyethylene) diol of compound (b).

The catalysts that are useful in producing polyurethane elastomers in accordance with this invention include: (a) tertiary amines such as bis[2-(N,N-dimethylamino)ethyl]ether, trimethylamine, triethylamine, N-methylmorpholine, N-ethylmorpholine, N,N-dimethylbenzylamine, N,N-dimethylethanolamine, N,N,N',N'-tetramethyl-1,3-butanediamine, triethanolamine, 1,4-diazabicyclo[2,2,2]octane, pyridine oxide and the like; (b) salts of organic acids with a variety of metals such as alkali metals, alkaline earth metals, Al, Sn, Pb, Mn, Co, Ni, and Cu, including, for example, sodium acetate, potassium laurate, calcium hexanoate, stannous acetate, and stannous octoate, and the like; (c) organometallic derivatives of tetravalent tin, trivalent and pentavalent As, Sb, and Bi, and metal carbonyls of iron and cobalt. Useful organotin compounds include dialkyltin salts of carboxylic acids, e.g., dibutyltin diacetate, dibutyltin dilaurate, dibutyltin maleate, dilauryltin diacetate, dioctyltin diacetate, dibutyltin-bis(4-methylaminobenzoate), dibutyltin-bis (6-methylaminocaproate), and the like.

The tertiary amines may be used as primary catalysts for accelerating the reactive hydrogen/isocyanate reaction or as secondary catalysts in combination with one or more of the above noted metal catalysts. Metal catalysts, or combinations of metal catalysts, may also be employed as the accelerating agents, without the use of amines.

When it is desired to produce a microcellular elastomer according to the process of the invention, a blowing agent is employed. Useful blowing agents include any compound capable of generating an inert gas under the conditions used to cure the elastomer (e.g., by reaction to produce a gas or by volatilization). Suitable blowing agents include water, $N_2$, $CO_2$ and volatile halocarbons (especially chlorocarbons and chlorofluorocarbons) such as methylene chloride, trichloromonofluoromethane, dichlorodifluoromethane, dichloromonofluoromethane, dichloromethane, trichloromethane, bromotrifluoromethane, chlorodifluoroethane, chloromethane, 1,1-dichloro-1,1-difluoromethane 1,1-difluoro 1,2,2-trichloroethane, chloropentafluoroethane, 1-chloro-1-fluoroethane, 1-chloro-2-fluoroethane, 1,1,2-trifluoroethane, 2-chloro-1,1,2,3,3,4,4-heptafluorobutane, hexafluorocyclobutane and octafluorobutane. Other useful blowing agents include low-boiling hydrocarbons such as butane, pentane, hexane, cyclohexane and the like. The amount of the blowing agent employed is determined by the desired elements of the microcellular elastomer to be produced. Microcellular elastomers generally have densities of 20 to 70 pounds per cubic foot and such densities can be achieved by employing from 3 to 20 parts by weight of a blowing agent (such as methylene dichloride or trichloromonofluoromethane) per 100 parts by weight of the active hydrogen-containing components and the isocyanate in the reaction mixture.

It is also within the scope of the invention to employ small amounts, e.g., about 0.001% to 5.0% by weight, based on the total reaction mixture, of a foam stabilizer. Useful stabilizers are block copolymer surfactants, including non-ionic polyoxyalkylene block copolymers, such as polyoxyethylene-polyoxypropylene block copolymers. Also useful are "hydrolyzable" polysiloxane-polyoxyalkylene block copolymers such as the block copolymers described in U.S. Pat. Nos. 2,834,748 and 2,917,480. Another useful class of emulsifiers are the "nonhydrolyzable" polysiloxane-polyoxyalkylene block copolymers such as the block copolymers described in U.S. Pat. No. 3,505,377; U.K. Patent Specification No. 1,341,028 and British Patent Specification No. 1,220,471. The latter class of copolymers differs from the above-mentioned polysiloxane-polyoxyalkylene block copolymers in that the polysiloxane moiety is bonded to the polyoxyalkylene moiety through direct carbon-to-silicon bonds, rather than through carbon-to-oxygen-silicon bonds. These various polysiloxane-polyoxyalkylene block copolymers preferably contain from 5 to 50 weight percent of polysiloxane polymer with the remainder being polyoxyalkylene polymer.

If desired, other additional ingredients can be employed in minor amounts in producing the polyurethane elastomers in accordance with the process of this invention. Illustrative of such additives that can be employed are: fillers; dyes; pigments; anti-oxidation agents; and the like. Indeed, in accordance with yet another aspect of the present invention, the use of filled elastomers may be employed to yield extremely hard elastomers. Thus, for example, where a particular end use application requires a relatively high Short D hardness, rather than utilizing excessive amounts of chain extender, the formulation could include suitable amounts of any conventional modulus enhancing filler material to yield an elastomer with that hardness.

The elastomers of the present invention may be formed into the desired final product by any known technique. However, it is preferred to prepare the formed elastomers according to the technique known as reaction injection molding or liquid reaction molding. This technique is described in Rubber Age, Volume 7, pages 46 to 48 (1975). When applying this technique to the present invention, demolding times as low as 15 seconds per part can be achieved in contrast to the 60 seconds or so demolding time typically required in present commercial applications. A suitable process sequence is as follows:

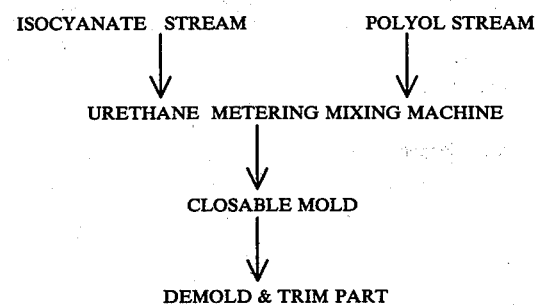

In accordance with another aspect of the present invention, "scrap" elastomer produced using the process of the present invention can be pelletized or reduced to chunks and re-processed by any technology utilizing polymer melts (e.g., compression molding, injection molding, extrusion and the like). Such "scrap" elastomer can be re-formed either by itself or in blends with other thermoplastic polyurethane elastomers.

The microcellular and solid elastomers produced in accordance with the present invention are useful in the production of automotive exterior body panels, gears, seals and the like.

As used herein, "elastomer" denotes an elastic composition which when solidified has a percent elongation value at the break point of greater than 50 percent; "scrap" elastomer encompasses both that generated directly during elastomer production and finished-product elastomer which is about to be scrapped and recycled; "pelletized" elastomer refers to elastomer which has been subdivided by any means into chunks, pellets or particles for re-processing purposes.

The following Examples are illustrative of, but are not intended to limit, the present invention.

EXPERIMENTAL

The following experimental description illustrates the present invention. In the experimental description, the following abbreviations are used:

| Abbreviation | Meaning |
|---|---|
| Diol I | A propylene glycol started poly-(oxypropylene-oxyethylene) diol having a 50 weight percent ethylene oxide content (35 weight percent randomly incorporated into the backbone, 15 weight percent cap) based on the total amount of ethylene oxide plus propylene oxide in the diol. The hydroxyl number of the diol was 28 and the molecular weight was about 4,000. The primary hydroxyl content of the diol was about 80 mole percent. |
| Polymer/Diol I | A polymer/diol containing about 16 weight percent in situ polymerized polyacrylonitrile in a base diol. The base diol is Diol I. The Brookfield viscosity of this polymer/diol was 3,056 centipoise at 25° C. |
| Polymer/Diol II | A polymer/diol containing about 20 weight percent of an in situ polymerized polymer in a base diol. The polymer comprises 78 wt. percent acrylonitrile and 22 wt. percent styrene. The base diol is Diol I. The Brookfield viscosity of this polymer/diol was 2,468 centipoise at 25° C. |
| Catalyst I | Dibutyltin dilaurate. |
| Extender I | 1,4-butanediol. |
| Surfactant I | A non-ionic polyoxyethylene-polyoxypropylene block copolymer surfactant. |
| Isocyanate Prepolymer I | A polyurethane quasi-prepolymer prepared by reacting 13 moles of 4,4'-diphenylmethane diisocyanate ("MDI") with one mole of a diol. The diol is a 57 hydroxyl number, 2000 molecular weight, propylene glycol started polyoxypropylene/polyoxyethylene diol in which the ethylene oxide was added as a 30 wt. percent cap. The diol had an acid number of 0.005 mg KOH/g, a water content of 0.011 wt. percent, and a primary hydroxyl content of about 80 mole percent. The free NCO content of this quasi prepolymer is 19.5 percent and the viscosity is about 300 centipoise at 25° C. |
| Wt. percent (wt. %) | Weight percent. |
| Parts | Parts by weight. |
| EW (Equivalent Weight) | A unit basis for calculation of reactant weight ratios. It is the weight of a substance that theoretically combines with one gram of hydrogen or eight grams of oxygen, i.e., EW (Hydrogen) = 1 and EW (Oxygen) = 8. |
| Hydroxyl Number (OH No.) | A measure of the equivalent weight of a hydroxyl-containing substance. OH No. $= \frac{56.1 \times 1000}{EW}$. Expressed as milligrams of potassium hydroxide per gram of material. |
| FNCO (Free NCO) | A measure of the EW of an isocyanate-containing material. % FNCO $= \frac{4.2}{EW} \times 1000$ |

Gel time denotes the interval of time in seconds for the elastomer to acquire sufficient strength to be handled.

Tack-free time denotes the interval of time in seconds for the elastomer to become free of stickiness or tackiness.

PROCEDURE A—Preparation Of Isocyanate Prepolymer I.

Into a dry, four-necked reactor placed in a heating mantle and equipped with a dry nitrogen gas inlet, a stirrer, a thermometer and a dropping funnel was charged 1400 grams of freshly filtered, liquid 4,4'-diphenylmethane diisocyanate (MDI). To the reactor was added 785 grams of Diol I dropwise by means of the dropping funnel with moderate stirring of the mixture in the reactor. A reactor temperature of 60° to 65° C. was maintained during the addition. After addition, the reaction mixture was maintained at 75° to 85° C. with stirring under a dry nitrogen gas blanket for about four and a half hours. During this time the reaction mixture changed from a clear, colorless to a slightly yellow color. The mixture was kept in the reactor overnight under gentle stirring and then was transferred to a narrow-mouthed bottle. The bottle was purged with nitrogen gas and sealed with insulation tape. The free NCO content of the polyurethane quasi-prepolymer product was 19.5 percent. The product was stored in an oven at 45° C.

PROCEDURE B—Hand-Casting Technique For Preparation Of The Urethane Elastomers Of Example 2.

Into a round-bottom flask equipped with a stirrer, thermometer, heating mantle and vacuum outlet were charged 71 parts of Polymer/Diol I, 29 parts of Extender I and 0.032 wt. percent of Catalyst I based on the total elastomer formulation. The resulting mixture was stirred and degassed; stirring was stopped, and 104 parts of Isocyanate Prepolymer I prepared in Procedure A were added to the mixture. The stirring under vacuum was re-applied for a short period of time, and then it was stopped and the vacuum was broken. The contents of the flask were poured into an open-type glass mold consisting of a "U" shaped "Teflon" gasket between two pieces of double-weight glass. After filling with the mixture, the mold was clamped with a spring-type clamp and placed upright in an oven for up to 16 hours in order to thoroughly cure the elastomer.

The elastomers of Examples 1 and 3 were prepared in accordance with an analogous procedure.

PROCEDURE C—Pelletizing And Injection Molding Of Elastomers.

Elastomers produced in accordance with Procedure B above were ground at low temperature in a Cumberland Dicer and dried for one week. The resulting pellets were then vacuum dried overnight at 70° C. and then injection molded at nozzle temperature of from 340° F. to 380° F. to produce bars for testing.

Elastomers of the present invention were also blended with commercial pelletized polyurethane elastomers for injection molding and testing. In this instance, the elastomers were dry blended by hand, vacuum dried overnight at 70° C. and injection molded at nozzle temperatures of from 340° F. to 380° F.

PROCEDURE—RIM Technique For Preparation Of Urethane Elastomers Of Runs 23-30 of Example 5.

Into one cylinder of a laboratory-scale RIM machine containing a two cylinder, one stroke electrically driven pump were charged 71 parts of Polymer/Diol I, 29 parts of Extender I and the selected amount (0.10 or 0.075 parts) of Catalyst I based on the total elastomer formulation. In Runs 25 to 28 and 30, 1.0 part of Surfactant I was also included in the charge. Into the other cylinder of the pump was charged 104 parts of Isocyanate Prepolymer I. The contents of the two cylinders were mixed using the high speed air driven mixer and the resulting mixture was delivered by the pump to a mold for forming the elastomer.

Two different types of molds were used: an open-type aluminum mold similar to the open-type glass mold of Procedure B, and a closed-type aluminum mold.

TABLE A

| Property | Physical Test Methods ASTM Method |
|---|---|
| Hardness, Shore D | D-2240 |
| Modulus, 100 and 300% | D-412 |
| Tensile Strength | D-412 |
| Elongation | D-412 |
| Flexural Modulus | D-790 |
| Die "C" Tear | D-624 |
| Heat Sag | The amount a sample 1 inch wide with a 4 inch cantilever droops when heated in an oven for 60 minutes at 250° F. |
| Resilience | The number of degrees less than full recovery of a 1 inch × 6 inches × 0.125 inch sample which is bent 180 degrees over a one-half inch diameter mandrel and then released. Recovery is measured after 30 seconds and after 300 seconds. |
| Melt Index | The time in seconds required to extrude a one inch long extrudate through an orifice having a diameter of 0.0823 inch at 212° C. |

TABLE A-continued

| Property | Physical Test Methods ASTM Method |
|---|---|
| | under a 1,100 gram weight |

EXAMPLES 1 to 3

A batch of Isocyanate Prepolymer I was prepared in accordance with Procedure A above. Using Procedure B, several elastomers were prepared as follows: the elastomers of Example 1 were produced using Diol I, the elastomers of Example 2 were produced using Polymer/Diol I, and the elastomers of Example 3 were produced using Polymer/Diol II. In addition, Catalyst I, Extender I and Isocyanate Prepolymer I were employed in each of the above formulations.

The results appear in Table I which follows.

TABLE I

| | Example 1[5] | Example 2[6] | Example 3[7] |
|---|---|---|---|
| Formulation | | | |
| Diol I, pph[1] | 65 | | |
| Polymer/Diol I, pph [2] | | 71 | |
| Polymer/Diol II, pph[2] | | | 71 |
| Catalyst I, wt. percent of total formulation | 0.032 | 0.032 | 0.032 |
| Extender I, pph[3] | 35 | 29 | 29 |
| Isocyanate Prepolymer I, Index 104 | 104 | 104 | 104 |
| Gel Time, seconds | 45 | 47 | 60 |
| Tack-Free Time, seconds | 50 | 53 | 65 |
| Elastomer Properties[4] | | | |
| Melt Index | 23.85 | 13.2 | 8.43 |
| Hardness, Shore D | 52 | 50 | 50 |
| Modulus, psi | | | |
| 100% | 1,769 | 1,841 | 1,907 |
| 300% | 2,524 | 2,444 | 2,704 |
| Tensile Strength, psi | 3,486 | 3,365 | 3,124 |
| Elongation, percent | 499 | 439 | 378 |
| Flexural Modulus, psi | | | |
| −20° F. | 39,822 | 49,385 | 53,634 |
| 75° F. | 19,921 | 21,402 | 18,479 |
| 158° F. | 14,600 | 15,242 | 15,558 |
| Flexural Modulus Ratio, −20° F./158° F. | 2.84 | 3.24 | 3.45 |
| Die "C" Tear | 494 | 480 | 485 |
| Heat Sag, inches at 250° F. | 0.12 | 0.12 | 0.175 |
| Resilience, degrees (30 seconds/300 seconds) | 6/4 | 6/5 | 8/6 |

[1]Parts per hundred parts of Diol I plus Extender I.
[2]Parts per hundred parts of Polymer/Diol I plus Extender I.
[3]Parts per hundred parts of Extender I plus the respective diol or polymer/diol.
[4]Test methods are given in Table A.
[5]Average of 42 runs.
[6]Average of 3 runs.
[7]Average of 2 runs.

The results as presented in Table I clearly show the excellent physical and mechanical properties provided by the elastomer of the instant invention. For example, in Example 1 wherein the properties were measured as an average of 42 runs, a Shore D Hardness of 52 and a Tensile Strength of 3,486 psi were provided. In addition, it is to be noted that the Flexural Modulus Ratio (equal to the Flexural Modulus at −20° F. divided by the Flexural Modulus at 158° F.) for Example 1 is a low value of 2.84, indicating that the elastomer of Example 1 provides for retention of flexibility over a broad temperature range of −20° F. to 158° F. Examples 2 and 3 which are the average of 3 runs and 2 runs, respectively, provide similar results.

EXAMPLE 4

In accordance with a further aspect of the present invention, elastomer was pelletized and re-formed by injection molding, and the properties of the elastomer were tested against three commercial pelletized polyurethane elastomers. In other runs, elastomer of the present invention was also pelletized and blended with the three commercial elastomers prior to testing.

The results appear in Table II which follows.

commercial Elastomer B (Run 15), and in these runs only the Elongation at a strain rate of 20 inches per minute is greater for Elastomer B. In contrast, Runs 8 to 10 which employ 100 wt. percent Elastomer A2 provide Tensile Strength values that are considerably lower than those provided by Runs 15 and 20 which

TABLE II

EXAMPLE 4 - Injection Molding Of Pelletized Elastomers

| | | Injection Molding Conditions[7] | | | | | Properties[8] | | | | |
|---|---|---|---|---|---|---|---|---|---|---|---|
| | | Rear Zone Temp °F. | Front Zone Temp °F. | Nozzle Temp °F. | Injection Pressure, psi | Injection Cycle, seconds | Modulus, psi | Tensile Strength, psi | | Elongation % | |
| Run | Formulation | | | | | | | Strain Rate A[9] | Strain Rate B[10] | Strain Rate A[9] | Strain Rate B[10] |
| 1 | 100%[1] Elastomer A1[2] | 415 | 390 | 360 | 475 | 35 | 10,300 | 2,500 | | 600 | |
| 2 | 50% Elastomer A1, 50% Elastomer B[3] | 455 | 420 | 365 | 475 | 35 | 7,310 | 7,500 | | 770 | |
| 3 | 25% Elastomer A1, 75% Elastomer B | 455 | 420 | 365 | 500 | 35 | 6,600 | 7,500 | | 916 | |
| 4 | 100% Elastomer B | 455 | 420 | 365 | 525 | 35 | 10,100 | 6,270 | | 447 | |
| 5 | 50% Elastomer A1, 50% Elastomer C[4] | 455 | 425 | 375 | 425 | 35 | 12,000 | 7,500 | | >700 | |
| 6 | 25% Elastomer A1, 75% Elastomer C | 445 | 425 | 375 | 425 | 35 | 12,800 | 5,000 | | 638 | |
| 7 | 100% Elastomer C | 455 | 425 | 375 | 500 | 45 | 12,600 | 7,570 | | 440 | |
| 8 | 100% Elastomer A2[5] | 410 | 370 | 340 | 600 | 30 | 13,300 | 3,470 | 2,780 | 423 | 433 |
| 9 | 100% Elastomer A2 | 430 | 390 | 360 | 500 | 30 | 9,670 | 3,420 | 2,990 | 433 | 477 |
| 10 | 100% Elastomer A2 | 430 | 410 | 380 | 400 | 30 | 9,650 | 3,100 | 2,410 | 423 | 463 |
| 11 | 50% Elastomer A2, 50% Elastomer B | 450 | 400 | 360 | 500 | 30 | 10,500 | 6,320 | 4,580 | 518 | 587 |
| 12 | 50% Elastomer A2, 50% Elastomer B | 455 | 420 | 365 | 450 | 30 | 8,270 | 6,500 | 4,360 | 535 | 560 |
| 13 | 25% Elastomer A2, 75% Elastomer B | 435 | 400 | 355 | 525 | 30 | 10,500 | 7,100 | 4,850 | 479 | 567 |
| 14 | 25% Elastomer A2, 75% Elastomer B | 455 | 420 | 365 | 425 | 30 | 10,700 | 7,800 | 4,710 | 570 | 628 |
| 15 | 100% Elastomer B | 455 | 420 | 365 | 525 | 35 | 10,100 | 6,270 | 4,670 | 447 | 630 |
| 16 | 50% Elastomer A2, 50% Elastomer D[6] | 445 | 390 | 365 | 600 | 30 | 9,940 | 6,090 | 4,870 | 383 | 422 |
| 17 | 50% Elastomer A2, 50% Elastomer D | 450 | 410 | 370 | 500 | 30 | 11,100 | 5,140 | 4,110 | 450 | 483 |
| 18 | 25% Elastomer A2, 75% Elastomer D | 450 | 410 | 370 | 575 | 30 | 10,700 | 8,150 | 5,500 | 437 | 442 |
| 19 | 25% Elastomer A2, 75% Elastomer D | 460 | 430 | 380 | 550 | 30 | 12,300 | 8,140 | 6,550 | 457 | 510 |
| 20 | 100% Elastomer D | 455 | 425 | 375 | 625 | 45 | 14,800 | 8,780 | 7,210 | 372 | 437 |

[1]% denotes weight percent
[2]Elastomer A1 corresponds to the elastomer formulation given in Example 1, Table I.
[3]Elastomer B corresponds to a pelletized thermoplastic polyurethane elastomer not of the instant invention. ("Pellethane 2354-45D")
[4]Elastomer C corresponds to a pelletized thermoplastic polyurethane elastomer not of the instant invention. ("Pellethane 2300-55D")
[5]Elastomer A2 corresponds to the elastomer formulation given in Example 2, Table I.
[6]Elastomer D corresponds to a pelletized thermoplastic polyurethane elastomer not of the instant invention. ("Pellethane 2103-55D")
[7]Injection molding of pelletized elastomers in accordance with Procedure C above.
[8]Properties measured in accordance with the procedures of Table A above.
[9]Strain Rate A corresponds to a strain rate of 2 inches per minute.
[10]Strain Rate B corresponds to a strain rate of 20 inches per minute.

The results as given in Table II indicate that the elastomers of the present invention are suitable for re-forming after pelletizing. Thus, "scrap" elastomers produced in accordance with the present invention can be reduced to pellets or chucks and re-processed using injection molding technology as given in Procedure C. The properties of the re-formed elastomer (i.e., Elastomer A1 and A2) are almost as good as, and in instances comparable to, those of commercial pelletized polyurethane elastomers (i.e., Elastomers B, C and D). In addition, after pelletizing, the elastomer of the present invention can be re-formed in blends with commercial pelletized polyurethane elastomer to provide a re-formed elastomer having good Modulus, Tensile Strength and Elongation properties. For example, Runs 13 and 14 which employ 25 wt. percent Elastomer A2 and 75 wt. percent Elastomer B provide greater Modulus, Tensile Strength and Elongation at a strain rate of 2 inches per minute than is provided by 100 wt. percent employ 100 wt. percent Elastomer B and D, respectively.

EXAMPLE 5

In order to determine the suitability of the elastomers of the present invention for production using Reaction Injection Molding (RIM), several runs were made on a laboratory-scale RIM machine with an open-type aluminum mold (Runs 23 to 28) and with a closed aluminum mold (Runs 29 to 30). As a comparison, two runs were made (Runs 21 and 22) using the hand-casting technique of Procedure B. Each of the elastomers of Runs 21 to 30 was produced from a formulation containing Polymer/Diol I, Extender I, Isocyanate Prepolymer I, and Catalyst I, and the formulations for the elastomers of Runs 22, 25 to 28, and 30 also contained Surfactant I.

The results appear in Table III which follows.

TABLE III

| Run Number | 21[3] | 22[3] | 23[4] | 24[4] | 25[4] | 26[4] | 27[4] | 28[4] | 29[5] | 30[5] |
|---|---|---|---|---|---|---|---|---|---|---|
| Formulation | | | | | | | | | | |
| Polymer/Diol I, pph[1] | 71 | 71 | 71 | 71 | 71 | 71 | 71 | 71 | 71 | 71 |
| Catalyst I, pph[1] | 0.038 | 0.038 | 0.10 | 0.10 | 0.10 | 0.10 | 0.075 | 0.075 | 0.10 | 0.10 |
| Extender I, pph[1] | 29 | 29 | 29 | 29 | 29 | 29 | 29 | 29 | 29 | 29 |
| Isocyanate Prepolymer I, Index 104, pph[1] | 104 | 104 | 104 | 104 | 104 | 104 | 104 | 104 | 104 | 104 |
| Surfactant I, pph[1] | 0 | 1.0 | 0 | 0 | 1.0 | 1.0 | 1.0 | 1.0 | 0 | 1.0 |

TABLE III-continued

| Run Number | 21[3] | 22[3] | 23[4] | 24[4] | 25[4] | 26[4] | 27[4] | 28[4] | 29[5] | 30[5] |
|---|---|---|---|---|---|---|---|---|---|---|
| Polymer/Diol I Plus Extender I Temperature, °C. | ~23 | ~23 | 23 | 23 | 23 | 23 | 57 | 57 | 23 | 23 |
| Isocyanate Temperature, °C. | ~23 | ~23 | 43 | 44 | 44 | 44 | 44 | 44 | 45 | 45 |
| Gel Time, seconds | 35-40 | 38 | 9 | 9 | 10 | 10 | 10 | 10 | 11 | 11 |
| Mold Temperature, °C. | ~100 | ~100 | ~55 | ~55 | ~55 | ~55 | ~55 | ~55 | ~55 | ~55 |
| Demold Time, minutes | 960 | 960 | 2 | 2 | 2 | 2 | 2 | 2 | 2 | 2 |
| Curing Time, (hours/°C.) | 16/100 | 16/100 | 0.5/120 | 16/100 | 0.5/120 | 16/100 | 0.5/121 | 16/100 | 0.5/121 | 0.5/121 |
| Elastomer Properties[2] | | | | | | | | | | |
| Hardness, Shore D | 50 | 51 | 49 | 49 | 48 | 48 | 48 | 49 | 50 | 48 |
| Modulus, psi | | | | | | | | | | |
| 100% | 1854 | 1854 | 1710 | 1677 | 1782 | 1703 | 1706 | 1699 | 1690 | 1745 |
| 300% | 2558 | 2333 | 2682 | 2355 | 2699 | 2470 | 2586 | 2439 | 2586 | 2655 |
| Tensile Strength, psi | 3550 | 2907 | 3592 | 2444 | 3131 | 2503 | 3520 | 2606 | 3833 | 3890 |
| Elongation, percent | 448 | 429 | 421 | 323 | 353 | 303 | 430 | 340 | 448 | 444 |
| Flexural Modulus, psi | | | | | | | | | | |
| −20° F. | 43514 | 38312 | 46134 | 47283 | 45058 | 45348 | 45381 | 41801 | 46277 | 42019 |
| 75° F. | 16771 | 20482 | 15950 | 16335 | 15595 | 16782 | 16414 | 15705 | 13516 | 14803 |
| 158° F. | 13926 | 16304 | 9882 | 10235 | 10554 | 10783 | 11246 | 10393 | 9194 | 10436 |
| Flexural Modulus Ratio, −20° F./158° F. | 3.12 | 2.35 | 4.67 | 4.62 | 4.27 | 4.21 | 4.04 | 4.02 | 5.03 | 4.03 |
| Die "C" Tear | 473 | 524 | 590 | 585 | 547 | 589 | 585 | 561 | 543 | 565 |
| Heat Sag, inches at 250° F. | 0.25 | 0.08 | — | — | — | — | — | — | 0.30 | 0.31 |
| Resilience, degrees (30 seconds/300 seconds) | 10/6 | 8/6 | — | — | — | — | — | — | 8/6 | 8/6 |

[1]Parts per hundred parts of Polymer/Diol I plus Extender I.
[2]Test methods are given in Table A.
[3]according to Procedure B.
[4]Using laboratory RIM machine according to Procedure D. employing the open-type aluminum mold.
[5]Using laboratory RIM machine according to Procedure D. employing the closed-type aluminum mold.

The results as presented in Table III demonstrate the suitability of the elastomers of the present invention for production using RIM. For example, the range of Shore D Hardness values for the elastomers produced by RIM (values of 48 to 50 for Runs 23–30) is comparable to the range for the hand-cast elastomers (values of 50 and 51) for Runs 21 and 22, respectively). In addition, values for Tensile Modulus, Tensile Strength, Elongation, Die "C" Tear and Resilience are comparable for RIM and hand-cast elastomers. The flexural Modulus Ratio values for the hand-cast elastomers (3.12 and 2.35 for Runs 21 and 22, respectively) are lower than those provided by the RIM elastomers (ranging from 4.03 to 5.03), indicating that the hand-cast elastomers provide for greater retention of flexibility over the temperature range of −20° F. to 158° F. than is provided by the RIM elastomers. The use of Surfactant I in the formulation for the elastomer of Run 22 produced an elastomer having a lower Flexural Modulus Ratio than that provided by the elastomer of Run 21 which was produced from a formulation containing no surfactant (2.35 versus 3.12, respectively). With respect to the RIM elastomers, those elastomers produced from formulations employing Surfactant I (Runs 25 to 28 and 30) showed a slight decrease in Flexural Modulus Ratio relative to the elastomers produced from formulations containing no surfactant (Runs 23, 24 and 29).

RIM elastomers produced using both the open-type mold (Runs 23 to 28) and the closed mold (Runs 29 and 30) provided good properties. Changes in the Polymer/Diol I plus Extender I temperature, and changes in elastomer curing time and temperature, did not produce significant changes in the properties of the resulting RIM elastomers.

What is claimed is:

1. A process for producing a solid or microcellular polyether polyurethane elastomer which comprises reacting a reaction mixture containing:
   (a) a liquid polyurethane quasi-prepolymer having a free NCO content of from about 16 percent to about 25 percent in an amount that provides from 0.8 to 1.1 isocyanato groups per active hydrogen group in the reaction mixture, produced by reacting a poly(oxypropylene-oxyethylene)diol having a molecular weight of at least 500 with an aromatic diisocyanate,
   (b) a poly(oxypropylene-oxyethylene) diol having a molecular weight of at least 1000, having terminal oxyethylene groups, and having a primary hydroxyl content of at least 50 mole percent,
   (c) from 5 to 75 parts by weight of a diol extender selected from the group consisting of short-chain alkane diols and short-chain oxyalkylene glycols per 95 to 25 parts by weight of (b), and
   (d) a catalytic amount of catalyst for curing the reaction mixture to produce the elastomer.

2. The process of claim 1 wherein the reaction mixture also contains:
   (e) a blowing agent in an amount sufficient to produce a microcellular structure in the elastomer.

3. A microcellular elastomer produced by the process of claim 2.

4. The process of claim 2 wherein the poly(oxypropylene-oxyethylene) diol is a polymer/poly(oxypropyleneoxyethylene) diol.

5. A microcellular elastomer produced by the process of claim 4.

6. The process of claim 2 wherein the aromatic diisocyanate is 4,4'-diphenylmethane diisocyanate.

7. A microcellular elastomer produced by the process of claim 6.

8. The process of claim 2 wherein the extender is a short-chain alkane diol.

9. A microcellular elastomer produced by the process of claim 8.

10. The process of claim 8 wherein the alkane diol is 1,4-butanediol.

11. A microcellular elastomer produced by the process of claim 10.

12. The process of claim 2 wherein the extender is a short-chain oxyalkylene glycol.

13. A microcellular elastomer produced by the process of claim 12.

14. The process of claim 1 wherein the reaction mixture contains no blowing agent.

15. A solid elastomer produced by the process of claim 14.

16. The process of claim 14 wherein the poly(oxypropylene-oxyethylene) diol is a polymer/poly(oxypropyleneoxyethylene) diol.

17. A solid elastomer produced by the process of claim 16.

18. The process of claim 14 wherein the aromatic diisocyanate is 4,4'-diphenylmethane diisocyanate.

19. A solid elastomer produced by the process of claim 18.

20. The process of claim 14 wherein the extender is a short-chain alkane diol.

21. A solid elastomer produced by the process of claim 20.

22. The process of claim 20 wherein the alkane diol is 1,4-butanediol.

23. A solid elastomer produced by the process of claim 22.

24. The process of claim 14 wherein the extender is a short-chain oxyalkylene glycol.

25. A solid elastomer produced by the process of claim 24.

26. The process of claim 1 wherein the liquid polyurethane quasi-prepolymer has a free NCO content of from about 18 percent to about 22 percent.

27. A solid elastomer produced by the process of claim 26.

28. A microcellular elastomer produced by the process of claim 26.

29. The process of claim 1 wherein the reaction mixture also contains:
(f) a minor amount of a block copolymer surfactant.

30. The process of claim 29 wherein the block copolymer surfactant is a polyoxyalkylene block copolymer surfactant.

31. The process of claim 30 wherein the polyoxyalkylene block copolymer surfactant is a polyoxypropylenepolyoxyethylene block copolymer surfactant.

32. The process of claim 29 wherein the block copolymer surfactant is a siloxane-polyoxyalkylene block copolymer.

33. A liquid polyurethane quasi-prepolymer having a free NCO content of from about 16 percent to about 25 percent that is produced by reacting a poly(oxypropyleneoxyethylene) diol having a molecular weight of at least 500 with an aromatic diisocyanate.

34. The quasi-prepolymer of claim 37 wherein the aromatic diisocyanate is 4,4'-diphenylmethane diisocyanate.

35. The quasi-prepolymer of claim 32 wherein the poly(oxypropylene-oxyethylene) diol has a molecular weight of from about 1,500 to about 2,500.

36. The quasi-prepolymer of claim 33 having a free NCO content of from about 18 percent to about 22 percent.

* * * * *